(12) United States Patent
Beveridge et al.

(10) Patent No.: US 11,720,670 B2
(45) Date of Patent: *Aug. 8, 2023

(54) PREVENTING UNAUTHORIZED SCREEN CAPTURE ACTIVITY

(71) Applicant: Bank of America Corporation, Charlotte, NC (US)

(72) Inventors: Michael Beveridge, Waxhaw, NC (US); Elizabeth R. Liuzzo, Charlotte, NC (US); Daniel Horne, Charlotte, NC (US); Marci Landy, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,221

(22) Filed: Jan. 27, 2022

(65) Prior Publication Data

US 2022/0147625 A1    May 12, 2022

Related U.S. Application Data

(63) Continuation of application No. 16/526,017, filed on Jul. 30, 2019, now Pat. No. 11,281,771.

(51) Int. Cl.
*G06F 21/55*    (2013.01)
*G06F 21/34*    (2013.01)
*C03C 4/08*    (2006.01)
*G06N 20/00*    (2019.01)
*G06F 21/44*    (2013.01)

(52) U.S. Cl.
CPC ............. *G06F 21/554* (2013.01); *C03C 4/082* (2013.01); *G06F 21/34* (2013.01); *G06F 21/44* (2013.01); *G06N 20/00* (2019.01)

(58) Field of Classification Search
CPC ........ G06F 21/554; G06F 21/34; G06F 21/44; G06N 20/00; C03C 4/082
See application file for complete search history.

(56) References Cited

U.S. PATENT DOCUMENTS

| 8,759,777 B2 | 6/2014 | Tsang et al. |
| 11,281,771 B2 | 3/2022 | Beveridge et al. |
| 2003/0006957 A1* | 1/2003 | Colantonio ............. G06F 21/84 345/156 |
| 2005/0180567 A1 | 8/2005 | Williams |
| 2010/0005526 A1* | 1/2010 | Tsuji ....................... G06F 21/84 726/21 |

(Continued)

Primary Examiner — Thaddeus J Plecha
(74) Attorney, Agent, or Firm — Banner & Witcott, Ltd.

(57) ABSTRACT

Aspects of the disclosure relate to preventing unauthorized screen capture activity. A computing platform may detect, via an infrared sensor associated with a computing device, an infrared signal from a second device attempting an unauthorized image capture of contents being displayed by a display device of the computing device. Subsequently, the computing platform may determine, via the computing platform, the contents being displayed by the display device. Then, the computing platform may retrieve a record of the contents being displayed by the display device. Then, the computing platform may determine a risk level associated with the infrared signal. Subsequently, the computing platform may perform, via the computing platform and based on the risk level, a remediation task to prevent the unauthorized image capture.

20 Claims, 5 Drawing Sheets

(56) References Cited

U.S. PATENT DOCUMENTS

| | | |
|---|---|---|
| 2012/0260307 A1 | 10/2012 | Sambamurthy et al. |
| 2016/0323243 A1 | 11/2016 | LeVasseur et al. |
| 2016/0358014 A1 | 12/2016 | Cohen et al. |
| 2017/0269699 A1 | 9/2017 | Withanage Don et al. |
| 2018/0213158 A1 | 7/2018 | Kim |
| 2018/0218163 A1 | 8/2018 | Ananthapur Bache et al. |
| 2019/0163932 A1 | 5/2019 | Olijnyk |
| 2019/0223011 A1 | 7/2019 | Gill et al. |
| 2019/0325159 A1 | 10/2019 | Olenoski et al. |
| 2020/0242360 A1 | 7/2020 | Alexander |

\* cited by examiner

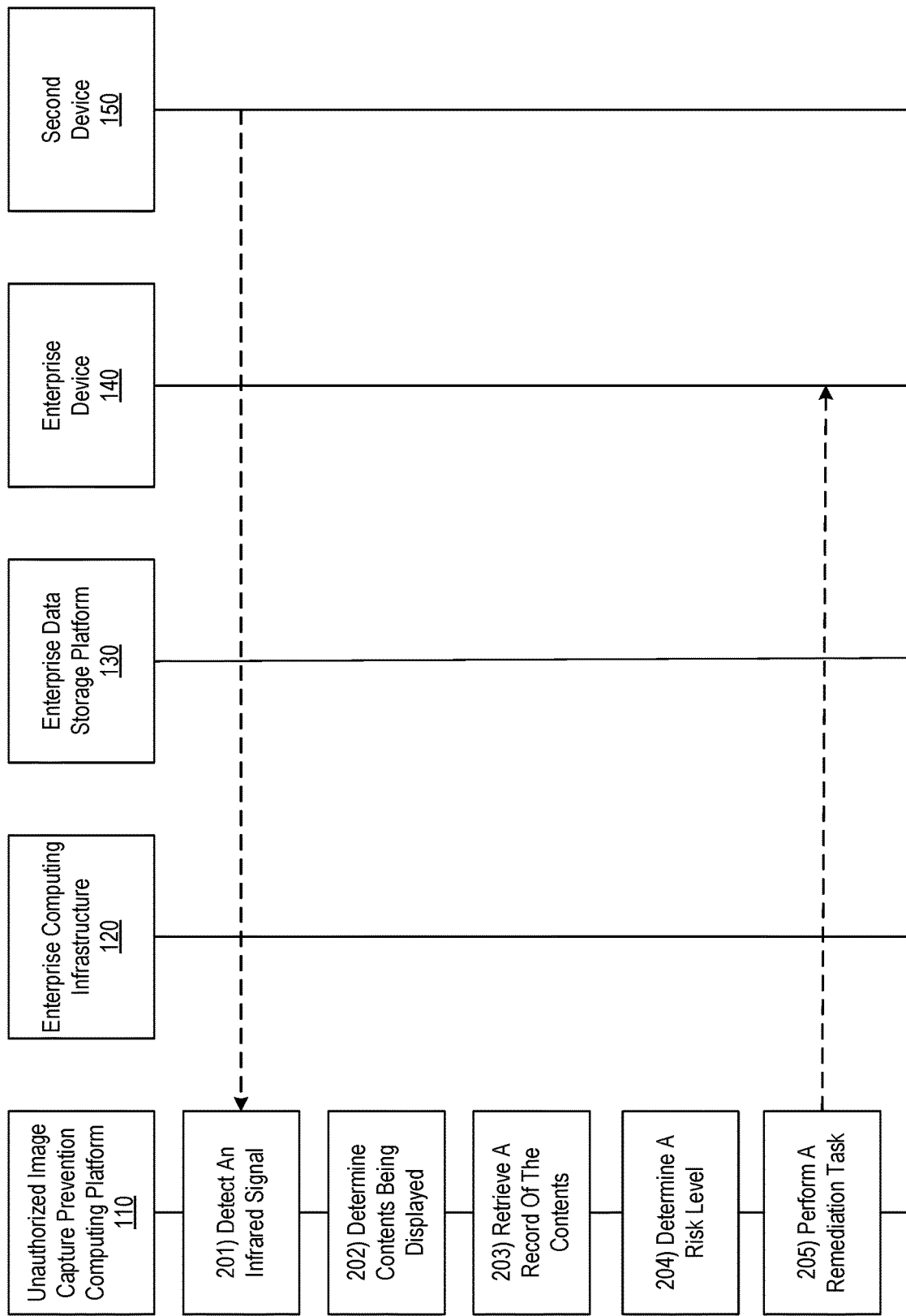

PREVENTING UNAUTHORIZED SCREEN CAPTURE ACTIVITY

CROSS-REFERENCE TO RELATED APPLICATIONS

This application is a continuation of U.S. patent application Ser. No. 16/526,017, the contents of which is hereby incorporated by reference in its entirety.

TECHNICAL FIELD

Aspects of the disclosure relate to deploying digital data processing systems, providing information security, and preventing unauthorized access to resources of enterprise systems. In particular, one or more aspects of the disclosure relate to preventing unauthorized screen capture activity.

BACKGROUND

Enterprise organizations may utilize various computing infrastructure to conduct business with their customers. Business related information may include confidential information and/or other sensitive data that is created and/or used for various purposes. In some instances, in performing duties and responsibilities related to conducting effective business activities, enterprise devices may be utilized to access customer information over various networks and/or between various computer systems. In some instances, such access may be performed at public places, thereby making the information vulnerable to potential malicious behavior. Preventing unauthorized access to information displayed on a display device associated with an enterprise device might play a significant role in maintaining the integrity and confidentiality of the underlying information. In many instances, however, it may be difficult to prevent unauthorized access in a timely and effective manner, while also attempting to optimize the resource utilization, bandwidth utilization, and efficient operations of the computing infrastructure.

SUMMARY

Aspects of the disclosure provide effective, efficient, scalable, fast, reliable, and convenient technical solutions that address and overcome the technical problems associated with preventing unauthorized screen capture activity. The term "preventing" is used herein to include both those instances when all contents on the screen display is fully blocked from capture, as well as those instance when a capture occurs, but is otherwise mitigated by blocking or obfuscating at least part of the screen display or by recording what content was captured and when.

In accordance with one or more embodiments, a computing platform having at least one processor, a communication interface, and memory may detect, via an infrared sensor associated with a computing device, an infrared signal from a second device attempting an unauthorized image capture of contents being displayed by a display device of the computing device. Subsequently, the computing platform may determine, via the computing platform, the contents being displayed by the display device. Then, the computing platform may retrieve a record of the contents being displayed by the display device. Then, the computing platform may determine a risk level associated with the infrared signal. Subsequently, the computing platform may perform, via the computing platform and based on the risk level, a remediation task to prevent the unauthorized image capture.

In some embodiments, the computing platform may cause the display device to display an alert notification to a user of the computing device. In addition, in some embodiments, the computing platform may cause the display device to cease to display the contents being displayed. Also, in some embodiments, the computing platform may deny access to operations of the computing device. Furthermore, in some embodiments, the computing platform may determine a number of attempted unauthorized image captures associated with the computing device. Then, the computing platform may trigger, based on a threshold of the number of attempted unauthorized image captures, a security threat assessment of the computing device. In addition, in some embodiments, the computing platform may receive, from the infrared sensor, an indication that the second device is attempting the unauthorized image capture of the contents being displayed by the display device. Then, the computing platform may generate, based on the contents being displayed, an instruction for the remediation task. Subsequently, the computing platform may send the instruction to a pixel driver associated with the display device of the computing device.

In some embodiments, the infrared sensor may include an array of sensors arranged on the display device of the computing device. In some embodiments, the computing platform may cause one or more sensors of the array of sensors to be automatically activated to perform the detecting the infrared signal. In some embodiments, the computing platform may cause the one or more sensors of the array of sensors to be automatically activated based on a random selection algorithm. In addition, in some embodiments, the computing platform may determine the risk level based on the contents being displayed by the display device. Also, in some embodiments, the infrared sensor may be an image capturing device associated with the computing device, and the image capturing device may be configured to apply image recognition techniques, and the computing platform may apply the image recognition techniques to identify objects in a field of view of the image capturing device. In some embodiments, the computing platform may identify, via the image capturing device and based on the image recognition techniques, the second device as another image capturing device. Then, the computing platform may automatically perform, based on the identifying, the remediation task. Finally, in some embodiments, the computing platform may detect, via a second infrared sensor, a second infrared signal from the second device attempting the unauthorized image capture of the contents. Then, the computing platform may corroborate, based on detecting the second infrared signal from the second device, detecting the first infrared signal from the second device.

The "infrared signal" is used herein to encompass both traditional signals that fall within the infrared range of frequency of light, as well as those signals that fall in a frequency of light range emitted by an image capture device to aid in the capturing of photographs.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A and 2B depict an illustrative event sequence for preventing unauthorized screen capture activity in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

Aspects of the disclosure relate to preventing unauthorized screen capture activity. A computing platform may detect, via an infrared sensor associated with a computing device, an infrared signal from a second device attempting an unauthorized image capture of contents being displayed by a display device of the computing device. Subsequently, the computing platform may determine, via the computing platform, the contents being displayed by the display device. Then, the computing platform may retrieve a record of the contents being displayed by the display device. Then, the computing platform may determine a risk level associated with the infrared signal. Subsequently, the computing platform may perform, via the computing platform and based on the risk level, a remediation task to prevent (or otherwise mitigate) the unauthorized image capture.

Some aspects of the disclosure relate to preventing unauthorized screen capture activity. For example, an enterprise device may be used to access an enterprise infrastructure. A display device associated with the enterprise device may display sensitive information related to the activities of the enterprise. In some instances, operator of the enterprise device, and/or a third party may attempt an unauthorized image capture of the displayed content. preventing (or otherwise mitigating) such an unauthorized image capture may be of significant importance to the successful operations of the enterprise.

In some instances, when a device associated attempts an unauthorized image capture of the displayed content, such an attempts may include the operation of an image capture device that transmits an infrared signal prior to the image capture. Accordingly, infrared sensors on the target enterprise device may be configured to detect the infrared signal, and computing platform may respond to such detection by taking appropriate steps to prevent (or otherwise mitigate) the unauthorized image capture. For example, the computing platform may cause the display device of the target enterprise device to not display content, and/or prevent access to operations of the target enterprise device.

Figure 1A:
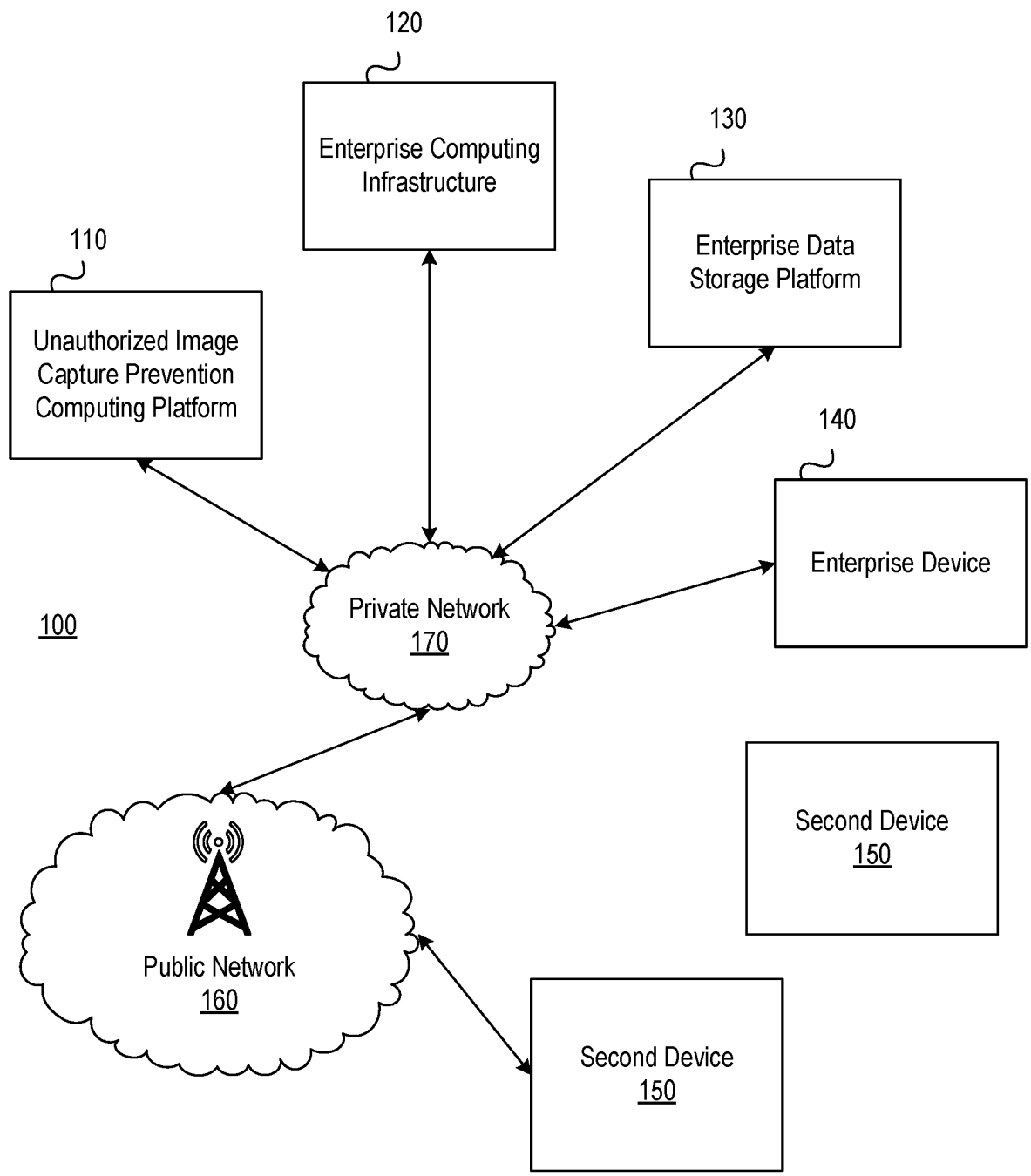
FIGS. 1A and 1B depict an illustrative computing environment for preventing unauthorized screen capture activity in accordance with one or more example embodiments.
Figure 1B:
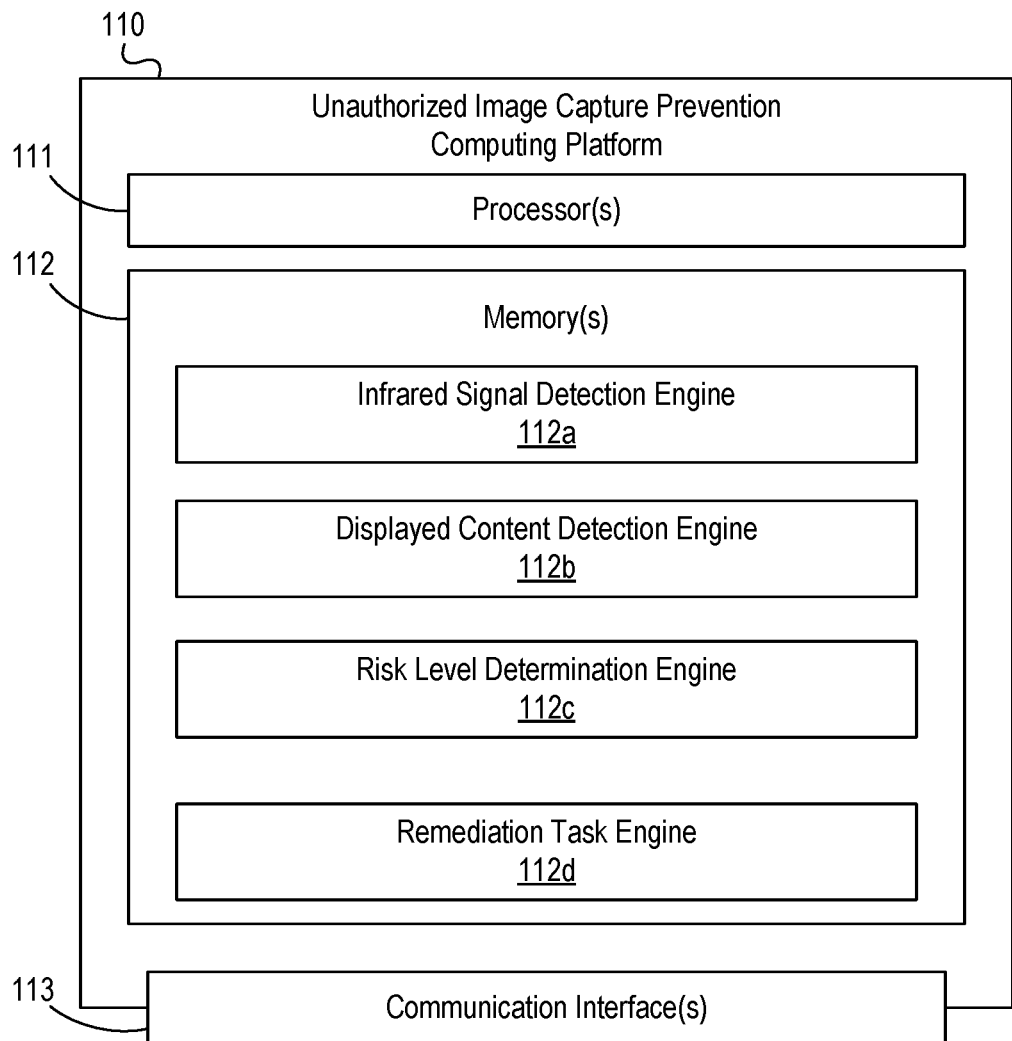

FIGS. 1A and 1B depict an illustrative computing environment for preventing unauthorized screen capture activity in accordance with one or more example embodiments. Referring to FIG. 1A, computing environment 100 may include one or more computer systems. For example, computing environment 100 may include unauthorized image capture prevention computing platform 110, enterprise computing infrastructure 120, enterprise data storage platform 130, enterprise device 140, and second device 150.

As illustrated in greater detail below, unauthorized image capture prevention computing platform 110 may include one or more computing devices configured to perform one or more of the functions described herein. For example, unauthorized image capture prevention computing platform 110 may include one or more computers (e.g., laptop computers, desktop computers, servers, server blades, or the like).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise applications. For example, enterprise computing infrastructure 120 may be configured to host, execute, and/or otherwise provide one or more programs associated with an enterprise organization, such as a financial institution. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain account information, such as financial account information including account balances, transaction history, account owner information, and/or other information. In addition, enterprise computing infrastructure 120 may process and/or otherwise execute transactions on specific accounts based on commands and/or other information received from other computer systems included in computing environment 100. Additionally or alternatively, enterprise computing infrastructure 120 may receive device lockdown requests from unauthorized image capture prevention computing platform 110 and return confirmation of such lockdown to unauthorized image capture prevention computing platform 110 in response to such authorization requests.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100. For example, enterprise data storage platform 130 may store risk levels, as discussed in more detail below, and/or historical data on attempted unauthorized image captures associated with an enterprise device, and/or may include data related to a time, location, user (e.g., user that was logged in to the enterprise device), and so forth.

Enterprise device 140 may be a personal computing device (e.g., desktop computer, laptop computer) or mobile computing device (e.g., smartphone, tablet). In addition, enterprise device 140 may be linked to and/or used by a specific enterprise user (who may, e.g., be an employee or other affiliate of an enterprise organization operating unauthorized image capture prevention computing platform 110).

Second device 150 may be a personal computing device (e.g., desktop computer, laptop computer) or mobile computing device (e.g., smartphone, tablet, wearable device). In addition, second device 150 may be linked to and/or used by a specific user. Also, for example, a user associated with second device 150 may use second device 150 to perform unauthorized image capture activity.

Computing environment 100 also may include one or more networks, which may interconnect one or more of unauthorized image capture prevention computing platform 110, enterprise computing infrastructure 120, enterprise data storage platform 130, and enterprise device 140. For example, computing environment 100 may include private network 170 (which may, e.g., interconnect unauthorized image capture prevention computing platform 110, enterprise computing infrastructure 120, enterprise data storage platform 130, and enterprise device 140, and/or one or more other systems which may be associated with an organization, such as a financial institution) and public network 160 (which may, e.g., interconnect second device 150 with private network 160 and/or one or more other systems, public networks, sub-networks, and/or the like). Public network 160 may be a high generation cellular network, such as, for example, a 5G or higher cellular network. In some embodiments, public network 160 may be configured to send and receive messages via different protocols, e.g. Bluetooth, Wireless Fidelity ("Wi-Fi"), near field communication ("NFC"), Infrared, cellular, and/or other protocols that enable device to device communication over short distances. Meanwhile in alternate embodiments, second device 150 might not be connected to public network 160; instead, in that embodiment, second device 150 may be a standalone device, such as a point-and-shoot camera or other comparable image capture device.

In one or more arrangements, enterprise computing infrastructure 120, enterprise data storage platform 130, and enterprise device 140, and second device 150, and/or the other systems included in computing environment 100 may be any type of computing device capable of receiving a user interface, receiving input via the user interface, and communicating the received input to one or more other computing devices. For example, enterprise computing infrastructure 120, enterprise data storage platform 130, and enterprise device 140, and second device 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of unauthorized image capture prevention computing platform 110, enterprise computing infrastructure 120, enterprise data storage platform 130, and enterprise device 140, and second device 150, may, in some instances, be special-purpose computing devices configured to perform specific functions.

Referring to FIG. 1B, unauthorized image capture prevention computing platform 110 may include one or more processors 111, memory 112, and communication interface 113. A data bus may interconnect processor 111, memory 112, and communication interface 113. Communication interface 113 may be a network interface configured to support communication between unauthorized image capture prevention computing platform 110 and one or more networks (e.g., network 160, network 170, or the like). Memory 112 may include one or more program modules having instructions that when executed by processor 111 cause unauthorized image capture prevention computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of unauthorized image capture prevention computing platform 110 and/or by different computing devices that may form and/or otherwise make up unauthorized image capture prevention computing platform 110. For example, memory 112 may have, store, and/or include infrared signal detection engine 112a, displayed content detection engine 112b, risk level determination engine 112c, and remediation task engine 112d.

Infrared signal detection engine 112a may build and/or update one or more device databases, build and/or update one or more device location data, build and/or update data related to detecting infrared signals, build and/or update image and/or object recognition data, build and/or update one or more other machine-learned models based on signals detected and remediation steps to be performed. Displayed content detection engine 112b may have instructions to utilize information provided by infrared signal detection engine 112a, and may have instructions that direct and/or cause unauthorized image capture prevention computing platform 110 to determine the contents being displayed by the display device, and/or retrieve a record of the contents being displayed by the display device. Risk level determination engine 112c may have instructions that direct and/or cause unauthorized image capture prevention computing platform 110 to determine a risk level associated with the infrared signal. Remediation task engine 112d may have instructions that direct and/or cause unauthorized image capture prevention computing platform 110 to perform, based on the risk level, a remediation task to prevent the unauthorized image capture.

Figure 2B:
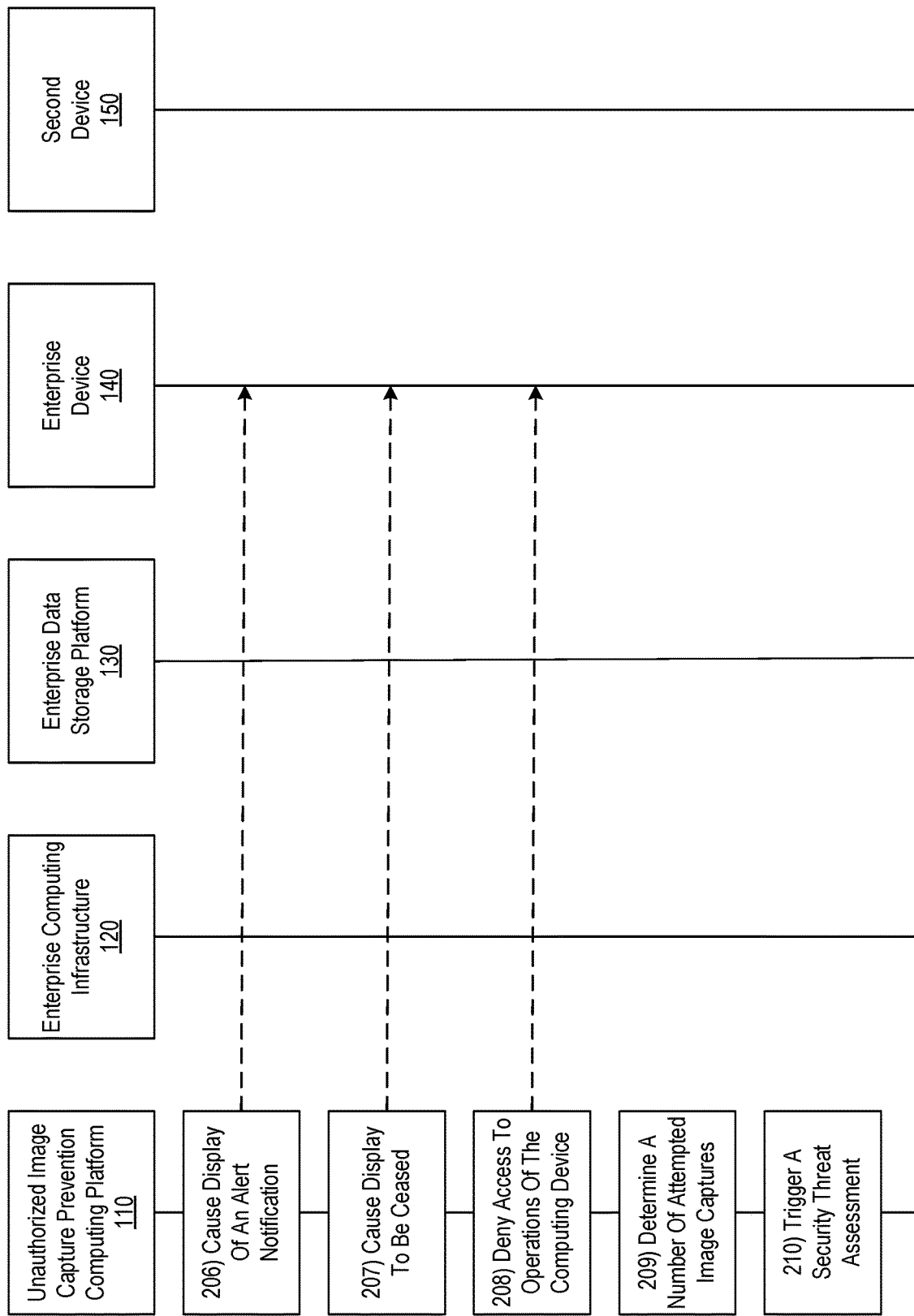

FIGS. 2A and 2B depict an illustrative event sequence for preventing unauthorized screen capture activity in accordance with one or more example embodiments. Referring to FIG. 2A, at step 201, unauthorized image capture prevention computing platform 110 may detect, via an infrared sensor associated with a computing device, an infrared signal from a second device attempting an unauthorized image capture of contents being displayed by a display device of the computing device. For example, a user of a computing device (e.g., enterprise device 140) may be accessing the enterprise computing infrastructure (e.g., enterprise computing infrastructure 120) associated with an enterprise organization (e.g., a financial institution) via the computing device (e.g., enterprise device 140). In some instances, information related to the enterprise organization may be displayed via a display device associated with the computing device (e.g., enterprise device 140). As described herein, contents being displayed by the display device may be confidential and/or highly sensitive information related to the enterprise organization.

In some instances, in an effort to misappropriate such confidential and/or highly sensitive information related to the enterprise organization, a second user associated with a second device (e.g., second device 150) may attempt an unauthorized image capture of the contents being displayed. In some instances, the user of the second device (e.g., second device 150) may utilize an image capturing device (e.g., a stand-alone camera, a wearable camera, a camera associated with a mobile device, and so forth) to capture one or more images of the contents being displayed. In some instances, such image capturing devices may be configured to transmit infrared signals prior to capturing an image.

Infrared signals are generally outside a visible range for humans. In an electromagnetic spectrum, infrared radiation is ranked next to light waves that are detectable by human vision. Accordingly, it may be impossible for the user of the computing device (e.g., enterprise device 140) to be aware of an infrared signal being directed at the display device associated with the computing device (e.g., enterprise device 140). Also, for example, image capturing devices may not be conspicuous and may avoid visible detection.

Accordingly, the computing device (e.g., enterprise device 140) may be equipped with an infrared sensor that is capable of detecting an infrared signal. For example, when the second device (e.g., second device 150) attempts an unauthorized image capture of contents being displayed by the display device associated with the computing device (e.g., enterprise device 140), and a camera associated with the second device (e.g., second device 150) transmits the infrared signal prior to capturing an image, unauthorized image capture prevention computing platform 110 may detect the infrared signal via the infrared sensor associated with the computing device (e.g., enterprise device 140).

In some embodiments, the infrared sensor may include an array of sensors arranged on the display device of the computing device. For example, an array of sensors may be arranged along two vertical sides of a display device associated with the computing device (e.g., enterprise device 140). Also, for example, an array of sensors may be arranged on a display side of a mobile computing device. In some instances, the array of sensors may be embedded into a graphical user interface of the display device.

In some embodiments, unauthorized image capture prevention computing platform 110 may cause one or more sensors of the array of sensors to be automatically activated to perform the detecting the infrared signal. For example, unauthorized image capture prevention computing platform 110 may determine that some of the sensors may be obstructed, and may identify one or more sensors of the array of sensors that may be utilized to detect an infrared signal. Accordingly, unauthorized image capture prevention computing platform 110 may automatically activate the one or more sensors of the array of sensors. As another example, unauthorized image capture prevention computing platform 110 may determine that some of the sensors may have been tampered with and may have become inoperable, and unauthorized image capture prevention computing platform 110 may automatically activate the one or more sensors of the array of sensors that retain operability.

In some examples, unauthorized image capture prevention computing platform 110 may cause one or more sensors of the array of sensors to be automatically activated based on a location of the computing device (e.g., enterprise device 140). For example, unauthorized image capture prevention computing platform 110 determine, based on highly precise location data from higher generation wireless networks that the computing device (e.g., enterprise device 140) is at a busy public location, such as a coffee shop, an airport, and the like. Accordingly, there may be a higher likelihood for malicious activity directed at the computing device (e.g., enterprise device 140). In such instances, unauthorized image capture prevention computing platform 110 may determine that a larger number of sensors may need to be automatically activated.

In some embodiments, based on image processing abilities of a camera associated with the computing device (e.g., enterprise device 140), unauthorized image capture prevention computing platform 110 may identify devices, in a field of view of the camera, that are capable of capturing images of the display device. Accordingly, unauthorized image capture prevention computing platform 110 may select appropriate sensors that may be able to detect infrared signals from such devices capable of capturing images.

In some embodiments, unauthorized image capture prevention computing platform 110 may cause the one or more sensors of the array of sensors to be automatically activated based on a random selection algorithm. For example, an individual with a malicious intent may attempt to undermine an ability of the computing device (e.g., enterprise device 140) to detect infrared signals. Such an attempt may include, for example, tampering with the sensors, and/or interfering with an ability for the sensors to operate. Accordingly, if the individual with the malicious intent is unable to physically detect all the sensors, and/or is unable to predict which of the one or more sensors may become operable, then such individual's ability to undermine the enterprise organization may be substantially thwarted. One manner in which predictability may be thwarted is by applying a randomized algorithm to determine which of the one or more sensors may be activated at any given time.

In some embodiments, a random selection algorithm may be based on a uniform probability distribution where all the sensors are equally weighted. In some embodiments, the sensors may be assigned non-uniform weights. For example, in some instances, sensors that are arranged along the two vertical sides of the display device may be assigned higher weights than sensors that are arranged along the bottom side of the display device. In such an arrangement, the random selection algorithm may be more likely to select the sensors that are arranged along the two vertical sides of the display device. Also, for example, sensors that are embedded within a graphical user interface of a display device may be assigned higher weights (e.g., such sensors may more accurately determine a target of a malicious intent of the second device) than sensors that are located external to the graphical user interface. In such an arrangement, the random selection algorithm may be more likely to select the sensors that are embedded within the graphical user interface of the display device, than those that are located external to the graphical user interface.

In some embodiments, the infrared sensor may be an image capturing device associated with the computing device. For example, cameras in mobile devices may be equipped with an infrared sensor. Also, for example, an image capturing device associated with a laptop, a wearable device, and so forth may be equipped with an infrared sensor.

In some embodiments, the image capturing device associated with the computing device may be configured to apply image recognition techniques. For example, cameras in mobile devices may be equipped with an image recognition software, and unauthorized image capture prevention computing platform 110 may apply image recognition techniques embodied in such software. For example, the image recognition software may be configured to identify locations (e.g., in a car, at an airport, at a coffee shop, in a private office, and so forth).

In some embodiments, unauthorized image capture prevention computing platform 110 may apply the image recognition techniques to identify objects in a field of view of the image capturing device. For example, the image recognition techniques may include an ability to perform facial recognition, object recognition, action recognition, and so forth. For example, the image recognition techniques may include facial recognition capabilities, and unauthorized image capture prevention computing platform 110 may apply the image recognition techniques to identify an individual as an individual likely to attempt an unauthorized image capture. For example, unauthorized image capture prevention computing platform 110 may have previously detected an individual, Individual A, at a prior location, Location A. Unauthorized image capture prevention computing platform 110 may have saved an image of Individual A in an enterprise database (e.g., enterprise data storage platform 130).

Upon application of facial recognition capabilities, unauthorized image capture prevention computing platform 110 may detect Individual A at another location, Location B. For example, unauthorized image capture prevention computing platform 110 may perform a comparison of a current image of Individual A against a collection of images stored in the enterprise database (e.g., enterprise data storage platform 130). Accordingly, unauthorized image capture prevention computing platform 110 may cause one or more remediation steps to be triggered. In some instances, such remediation steps may be performed prior to detecting an infrared signal from an image capturing device associated with Individual A.

In some embodiments, unauthorized image capture prevention computing platform 110 may detect, via a second infrared sensor, a second infrared signal from the second device attempting the unauthorized image capture of the contents. For example, a first infrared sensor associated with computing device (e.g., enterprise device 140) may detect an infrared signal from a second device (e.g., second device 150). At or about the same time, a second infrared signal may be detected by a second infrared sensor from the second device. For example, a first sensor and a second sensor from an array of sensors may independently detect infrared signals from the second device (e.g., second device 150). Accordingly, in some embodiments, unauthorized image capture prevention computing platform 110 may corroborate, based on detecting the second infrared signal from the second device, detecting the first infrared signal from the second device.

In some embodiments, the first infrared sensor associated with computing device (e.g., enterprise device 140) may be an infrared sensor associated with a desktop computing device at an enterprise facility. Also, for example, the second infrared sensor may be associated with a surveillance camera at the enterprise facility. In some embodiments, the first infrared sensor and the second infrared sensor may independently detect infrared signals from the second device (e.g., second device 150). Accordingly, in some embodiments, unauthorized image capture prevention computing platform 110 may corroborate data obtained from the two independent infrared sensors, based on detecting independent infrared signals from the same second device, and further based on such detecting being performed by independent devices.

At step 202, unauthorized image capture prevention computing platform 110 may determine the contents being displayed by the display device. For example, unauthorized image capture prevention computing platform 110 may communicate with an enterprise server hosted by an enterprise computing infrastructure (enterprise computing infrastructure 120) and determine that the computing device (e.g., enterprise device 140) may be accessing content. Also, for example, unauthorized image capture prevention computing platform 110 may determine, from the enterprise server, the contents being displayed by the display device.

At step 203, unauthorized image capture prevention computing platform 110 may retrieve a record of the contents being displayed by the display device. For example, upon a determination of the contents being displayed by the display device, unauthorized image capture prevention computing platform 110 may retrieve a snapshot of the contents being displayed by the display device. For example, unauthorized image capture prevention computing platform 110 may cause a snipping tool, or other screen print tool, available (e.g., installed) on the computing device (e.g., enterprise device 140) to take a snapshot of the contents displayed on a graphical user interface associated with the display device. Also, for example, unauthorized image capture prevention computing platform 110 may communicate with the enterprise server to retrieve a copy of the contents being displayed by the display device. Subsequently, unauthorized image capture prevention computing platform 110 may store the retrieved record of the contents being displayed in the enterprise database (e.g., enterprise data storage platform 130).

At step 204, unauthorized image capture prevention computing platform 110 may determine a risk level associated with the infrared signal. In some embodiments, unauthorized image capture prevention computing platform 110 may determine the risk level based on the contents being displayed by the display device. In another example, unauthorized image capture prevention computing platform 110 may determine the risk level based on the systems connected to and being accessed by the enterprise device 140 at a given time. In some examples, the risk level may be set by the user or a supervisory user (e.g., the IT department, a user's supervisor/manager). In other embodiments, the risk level may be default to a particular value, and the unauthorized image capture prevention computing platform 110 may adjust the value upwards or downwards based on one or more of the aforementioned criterion.

At step 205, unauthorized image capture prevention computing platform 110 may perform, based on the risk level, a remediation task to prevent the unauthorized image capture. The remediation tasks may include, but are not limited to, one or more of the actions illustrated in FIG. 2B.

Referring to FIG. 2B, at step 206, unauthorized image capture prevention computing platform 110 may cause the display device (e.g., a screen) to display an alert notification to a user of the computing device. The alert notification may be simply a pop-up dialog box on the screen to alert the user that someone else may be attempting to or may have taken a photograph including the display device. In some examples, the alert notification may be inconspicuously positioned in a corner of the screen, or even simply as an icon on a taskbar or menu running along an edge of the screen. In other examples, the alert notification may obscure most/much/all of the screen such that no content is visible until the alert notification is closed or otherwise minimized.

At step 207, unauthorized image capture prevention computing platform 110 may cause the display device to cease to display the contents being displayed. In one example, the unauthorized image capture prevention computing platform 110 may send a command to the display device to cause it to black-out the screen. The black-out operation may be performed by causing the pixel driver of the display device to immediately change the color being outputted to the screen such that it obfuscates the contents of the screen; in some examples, the screen may become entirely one color. In other examples, the screen may take on more than one color during black-out operation. In other examples, the unauthorized image capture prevention computing platform 110 may cease display of the contents by blocking only those portions of the screen that include confidential, secret information while leaving intact the remaining portions.

At step 208, unauthorized image capture prevention computing platform 110 may deny access to operations of the computing device. In such examples, the infraction may be determined to be of high severity or of indeterminate severity, and the policy may simply be to lock-out the user until the situation can be assessed. The computing device may, in some examples, be locked out for a predetermined period of time. In another example, the computing device is manually unlocked by the IT department or other personnel.

In some embodiments, unauthorized image capture prevention computing platform 110 may receive, from the infrared sensor, an indication that the second device is attempting the unauthorized image capture of the contents being displayed by the display device. In some embodiments, unauthorized image capture prevention computing platform 110 may generate, based on the contents being displayed, an instruction for the remediation task. Meanwhile, in some embodiments, unauthorized image capture prevention computing platform 110 may send the instruction to a pixel driver associated with the display device of the computing device.

In one embodiment, unauthorized image capture prevention computing platform 110 may identify, via a first image capturing device and based on image recognition techniques, the second device a second image capturing device. In such an example, the first image capturing device is in network communication with the unauthorized image capture prevention computing platform 110, and captures an image of the second image capturing device in order to positively identify characteristics of the second image capturing device to be those indicative of an image capturing device. In some examples, the image recognition techniques may be advanced such that in addition to identifying a second image capturing device, the image recognition techniques also confirm that the second image capturing device is being operated. For example, if a human's finger is hovering over or pressing the shutter button on a point-and-shoot camera, or if the human's finger is pressing the touch screen to capture a photos. There are several other examples of actions that the image recognition techniques may associate with the operation of capturing an image with an image capture device.

In some embodiments, unauthorized image capture prevention computing platform 110 may automatically perform, based on the identifying, the remediation task. At step 209, unauthorized image capture prevention computing platform 110 may determine a number of attempted unauthorized image captures associated with the computing device. If the quantity of attempted unauthorized image captures exceeds a threshold amount, the unauthorized image capture prevention computing platform 110 may perform an operation to prevent further data breaches. Moreover, at step 210, unauthorized image capture prevention computing platform 110 may trigger, based on a threshold of the number of attempted unauthorized image captures, a security threat assessment of the computing device.

Figure 3:
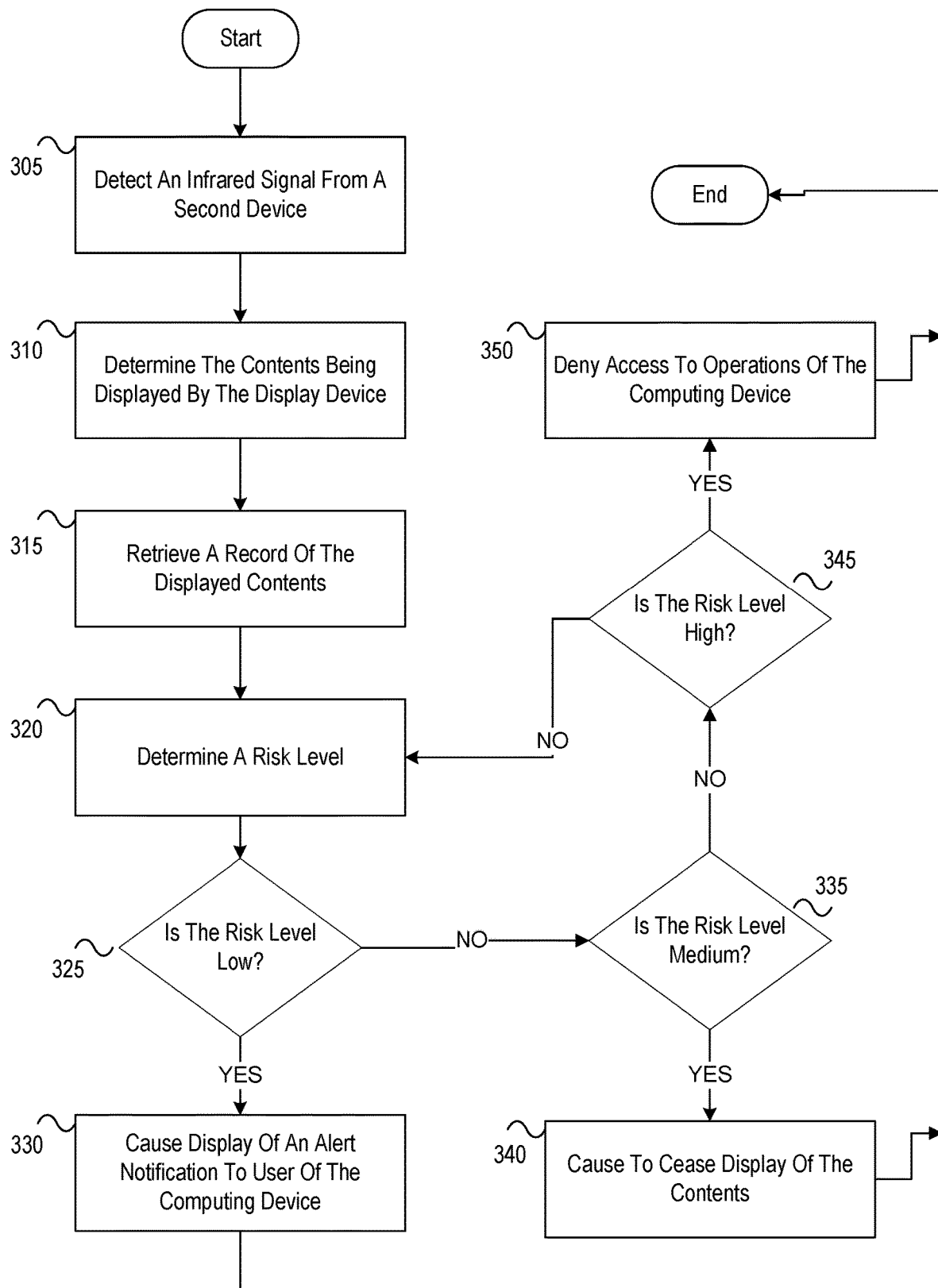
FIG. 3 depicts an illustrative method for preventing unauthorized screen capture activity in accordance with one or more example embodiments.

FIG. 3 depicts an illustrative method for preventing unauthorized screen capture activity in accordance with one or more example embodiments. Referring to FIG. 3, at step 305, a computing platform having at least one processor, a communication interface, and memory may detect, via an infrared sensor associated with a computing device, an infrared signal from a second device attempting an unauthorized image capture of contents being displayed by a display device of the computing device. At step 310, the computing platform may determine, via the computing platform, the contents being displayed by the display device. At step 315, the computing platform may retrieve a record of the contents being displayed by the display device. At step 320, the computing platform may determine a risk level associated with the infrared signal.

In some embodiments, one or more of the aforementioned steps of determining the contents (step 310), retrieving a record (step 315), and determining a risk level (step 320) may use a system of machine learning and/or artificial intelligence to improve accuracy of the assessment. A framework for machine learning may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons, may be dynamically configured to effectuate learning and decision-making. Moreover, machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

In an embodiment involving supervised machine learning, a graph module corresponding to an artificial neural network may receive and execute instructions to modify the computational graph. A supervised machine learning model may provide an indication to the graph module that output from the machine learning model was correct and/or incorrect. In response to that indication, the graph module may modify one or more nodes and/or edges to improve output. The modifications to the nodes and/or edges may be based on a prediction, by the machine learning model and/or the graph module, of a change that may result an improvement. The modifications to the nodes and/or edges may be based on historical changes to the nodes and/or edges, such that a change may not be continuously made and unmade (an undesirable trend which may be referred to as oscillation). Feedback may be additionally or alternatively received from an external source, such as an administrator, another computing device, or the like. Where feedback on output is received and used to reconfigure nodes and/or edges, the machine learning model may be referred to as a supervised machine learning model.

In supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of one hundred photos with labeled human faces and ten thousand random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct").

In one example, the machine learning engine may identify relationships between nodes that previously may have gone unrecognized. For example, using a collaborative filtering technique, the machine learning engine may identify that a node representing content on a screen should be connected to the user's relative, which is an attribute of the user. The machine learning engine may have identified that other screen captures involving the user's relative have also recently generated alert notifications. This realization by the machine learning engine may increase the heat of the specific node; and subsequently spread to connected nodes. This may result in particular nodes exceeding a threshold confidence to push those nodes to an updated outcome from a Boolean false to a Boolean true. Other examples of machine learning techniques may be used in combination or in lieu of a collaborative filtering technique included, but are not limited to a screen capture model, any time series trend analysis, and the like.

In addition, one theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

As elaborated herein, in practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

Referring to FIG. 3, at step 325, the computing platform may determine if the risk level associated with the infrared signal is "Low". If at step 325, the computing platform determines that the risk level is "Low", the computing platform may continue to step 330. At step 330, the computing platform may cause the display device to display an alert notification to a user of the computing device. If at step 325, the computing platform determines that the risk level is not "Low", the computing platform may continue to step 335.

At step 335, the computing platform may determine if the risk level associated with the infrared signal is "Medium". If at step 335, the computing platform determines that the risk level is "Medium", the computing platform may continue to step 340. At step 340, the computing platform may cause the display device to cease to display the contents being displayed. If at step 335, the computing platform determines that the risk level is not "Medium", the computing platform may continue to step 345.

At step 345, the computing platform may determine if the risk level associated with the infrared signal is "High". If at step 345, the computing platform determines that the risk level is "High", the computing platform may continue to step 350. At step 350, the computing platform may deny access to operations of the computing device. If at step 345, the computing platform determines that the risk level is not "High", the computing platform may continue to step 320 to determine a risk level for the same, and/or another infrared signal.

In some embodiments, one or more of the aforementioned steps 325, 335, and 345 may use a system of machine learning and/or artificial intelligence to improve accuracy of the assessment of risk level. As explained above, a framework for machine learning may involve a combination of supervised and unsupervised learning models.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

We claim:

1. A method, comprising:
   detecting, via an infrared sensor associated with a computing device, an infrared signal from a second device attempting an unauthorized image capture of contents being displayed by a display device of the computing device;
   determining the contents being displayed by the display device;
   determining, using machine learning, a risk level associated with the infrared signal; and
   performing based on the risk level, a remediation task to prevent the unauthorized image capture, wherein the performing the remediation task comprises:
      determining a number of attempted unauthorized image captures associated with the computing device; and
      triggering, based on a threshold of the number of attempted unauthorized image captures, a security threat assessment of the computing device.

2. The method of claim 1, wherein the performing the remediation task further comprises causing the display device to display an alert notification to a user of the computing device.

3. The method of claim 1, wherein the performing the remediation task further comprises causing the display device to cease to display the contents being displayed.

4. The method of claim 1, wherein the performing the remediation task further comprises denying access to operations of the computing device.

5. The method of claim 1, wherein the performing the remediation task further comprises:
   receiving, from the infrared sensor, an indication that the second device is attempting the unauthorized image capture of the contents being displayed by the display device;
   generating, based on the contents being displayed, an instruction for the remediation task; and
   sending the instruction to a pixel driver associated with the display device of the computing device.

6. The method of claim 1, wherein the infrared sensor comprises an array of sensors arranged on the display device of the computing device.

7. The method of claim 6, further comprising causing one or more sensors of the array of sensors to be automatically activated to perform the detecting the infrared signal.

8. The method of claim 7, wherein the causing the one or more sensors of the array of sensors to be automatically activated comprises causing the one or more sensors of the array of sensors to be automatically activated based on a random selection algorithm.

9. The method of claim 1, wherein the determining the risk level comprises determining the risk level based on the contents being displayed by the display device.

10. The method of claim 1, wherein the infrared sensor is an image capturing device associated with the computing device, and wherein the image capturing device is configured to apply image recognition techniques, and wherein the method further comprises applying the image recognition techniques to identify objects in a field of view of the image capturing device.

11. The method of claim 10, further comprising:
   identifying, via the image capturing device and based on the image recognition techniques, the second device as another image capturing device;
   wherein the performing the remediation task further comprises automatically performing, based on the identifying, the remediation task.

12. The method of claim 1, further comprising:
   detecting, via a second infrared sensor, the infrared signal from the second device attempting the unauthorized image capture of the contents; and
   corroborating, based on the second infrared sensor detecting the infrared signal from the second device, detecting the infrared signal from the second device via the infrared sensor.

13. One or more non-transitory computer-readable media storing instructions that, when executed by a computing platform comprising at least one processor and memory, cause the computing platform to:
   detect, via an infrared sensor associated with a computing device, an infrared signal from a second device attempting an unauthorized image capture of contents being displayed by a display device of the computing device;
   determine the contents being displayed by the display device;
   determine, using machine learning, a risk level associated with the infrared signal; and perform, via the computing platform and based on the risk level, a remediation task to prevent the unauthorized image capture, wherein the performing the remediation task comprises:
  determining a number of attempted unauthorized image captures associated with the computing device; and
  triggering, based on a threshold of the number of attempted unauthorized image captures, a security threat assessment of the computing device.

14. The non-transitory computer-readable media of claim 13, wherein the performing the remediation task further comprises one or more of:
  causing the display device to display an alert notification to a user of the computing device;
  causing the display device to cease to display the contents being displayed; or
  denying access to operations of the computing device.

15. A method comprising:
  detecting, via an image capturing device associated with a computing device, an infrared signal from a second device attempting an unauthorized image capture of contents being displayed by a display device of the computing device;
  detecting, via an infrared sensor apart from the image capturing device, the infrared signal from the second device attempting the unauthorized image capture of the contents;
  corroborating, based on the infrared sensor detecting the infrared signal from the second device, detecting the infrared signal from the second device;
  determining the contents being displayed by the display device;
  determining a risk level associated with the infrared signal; and
  performing, based on the risk level, a remediation task to prevent the unauthorized image capture.

16. The method of claim 15, further comprising:
  receiving, from the image capturing device, an indication that the second device is attempting the unauthorized image capture of the contents being displayed by the display device;
  generating, based on the contents being displayed, an instruction for the remediation task; and
  displaying the instruction for the remediation task on the display device of the computing device.

17. The method of claim 15, wherein the image capturing device comprises an array of infrared sensors arranged on the display device of the computing device, wherein the method further comprises causing one or more infrared sensors of the array of infrared sensors of the image capturing device to be activated to perform the detecting the infrared signal.

18. The method of claim 15, wherein the performing the remediation task comprises:
  determining a number of attempted unauthorized image captures associated with the computing device; and
  triggering, based on a threshold of the number of attempted unauthorized image captures, a security threat assessment of the computing device.

19. The method of claim 15, wherein the performing the remediation task further comprises one or more of:
  causing the display device to display an alert notification to a user of the computing device;
  causing the display device to cease to display the contents being displayed; or
  denying access to operations of the computing device.

20. The method of claim 15, wherein the determining the risk level comprises determining the risk level based on the contents being displayed by the display device.

* * * * *